United States Patent Office 3,239,540
Patented Mar. 8, 1966

3,239,540
1-DEHYDRO-6-FLUOROPROGESTERONES
J Allan Campbell, Kalamazoo, John C. Babcock, Portage Township, Kalamazoo County, and John A. Hogg, Kalamazoo, Mich., assignors to The Upjohn Company, Kalamazoo, Mich., a corporation of Michigan
No Drawing. Filed June 9, 1958, Ser. No. 740,555
3 Claims. (Cl. 260—397.3)

This invention relates to novel steroid compounds. It relates more particularly in their 6α and 6β epimer form to 1 - dehydro - 6α - fluoroprogesterone (6α - fluoro - 1,4-pregnadiene - 3,20 - dione), 1 - dehydro - 6β - fluoroprogesterone (6β - fluoro - 1,4 - pregnadiene - 3,20 - dione), and to processes for the production thereof.

This application is a continuation-in-part of copending application Serial No. 699,504, filed November 29, 1957, now Patent No. 2,838,528 issued June 10, 1958.

The new compounds and the process of the present invention are illustratively represented by the following formulae:

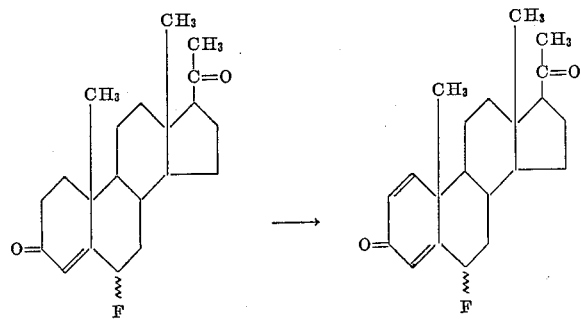

The process of the present invention comprises: subjecting a 6-fluoroprogesterone to biological dehydrogenation using microorganisms, for example, Septomyxa, or to chemical dehydrogenation with selenium dioxide to produce the corresponding 1 - dehydro - 6 - fluoroprogesterone.

In this application the wavy line (ξ) appearing at the 6-position is a generic expression including the alpha (α) and beta (β) configuration.

The compounds of the present invention, 1 - dehydro-6α - fluoroprogesterone and 1 - dehydro - 6β - fluoroprogesterone, are useful as oral and parenteral progestational agents. These compounds affect the secretion of gonadotropins and thus regulate ovulation and endometrial and placental development and, particularly when used in conjunction with estrogens, e.g., ethinylestradiol and/or androgens, e.g., 9α-fluoro-11β-hydroxy-17-methyltestosterone, reduce fertility, and constiute effective therapy for dysmenorrhea, amenorrhea, endometriosis, threatened abortion and related gynecological disorders.

The novel compounds of the present invention can be prepared and administered to the animal organism in a wide variety of oral and subcutaneous dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The starting materials for the present invention, 6α-fluoroprogesterone and 6β-fluoroprogesterone, can be prepared in accordance with the procedures disclosed in copending application Serial No. 699,504, filed November 29, 1957.

According to the process of the present invention dehydrogenation of the selected 6-fluoroprogesterone to obtain the Δ¹-analogue thereof is carried out either by fermentative or chemical dehydrogenation. Microorganisms such as *Septomyxa affinis*, Corynebacterium, Fusarium, and the like, are used under fermentation conditions well known in the art (e.g., U.S. 2,602,769) and furthermore illustrated by Examples 1 and 2, herein. The chemical dehydrogenation can be carried out with selenium dioxide according to procedures well known in the art and illustrated in detail in Example 3.

Illustrative of the compounds thus produced are 1-dehydro - 6α - fluoroprogesterone and 1 - dehydro - 6β-fluoroprogesterone, the latter compound being obtained when 6β-fluoroprogesterone is used as the starting material and the reaction is carried out at near neutral reaction conditions.

The 1-dehydro - 6β - fluoroprogesterone thus obtained can be converted by epimerization to 1-dehydro-6α-fluoroprogesterone. Conversion of the 6β-epimer can be accomplished by treatment at temperatures of zero degrees centigrade, or slightly higher or lower temperatures, in an organic solvent, such as chloroform, methylene chloride, ether, and the like, and in the presence of a prototropic agent (proton-donating reagent) such as alcohols, organic acids, and the like, with a hydrogen halide, such as hydrogen chloride gas. The mixture should be maintained at a temperature of zero degrees centigrade, although slightly higher or lower temperatures can be used, during the addition of the acid. The reaction mixture can then be washed with successive portions of dilute alkali and water, and then dried and evaporated under reduced pressure. The 6α-fluoro product can be recovered from the crude reaction product and purified by recrystallization.

Alternatively, the epimerization can be accomplished with alkali. Bases, for example, solutions of sodium hydroxide and potassium hydroxide, may be used to treat the 6β-epimer in solution in an oganic solvent, such as methanol, to produce the 6α-epimer.

The following examples are illustrative of the process and products of the present invention, but are not to be construed as limiting.

*Example 1.—1-dehydro-6α-fluoroprogesterone (6α-fluoro-1,4-pregnadiene-3,20-dione)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the waterbath, adjusted to 28 degrees centigrade and the contents stirred thoroughly (300 r.p.m.), and aerated (0.1 liter of air per minute to ten liters of beer). After twenty hours of incubation, when a good growth has been developed, one gram of 6α-fluoroprogesterone dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated. The resulting residue is chromatographed over a Florisil anhydrous magnesium silicate column. The column is packed with 100 grams of Florisil synthetic magnesium silicate and is developed with 200-milliliter fractions each of Skellysolve B hexanes containing three percent, five percent, 7.5 percent and ten percent and twelve percent acetone. The crystalline material which is obtained from the ten and twelve percent acetone in Skellysolve B hexanes elutions is recrystallized from ether-Skellysolve B hexanes to give crystals of 1-dehydro-6α-fluoroprogesterone.

Instead of Septomyxa, species of other genera such as Corynebacterium, Didymella, Calonectria, Alternaria, Collectotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tucerculariaceae can be used to introduce a $\Delta^1$-bond into 6α-fluoroprogesterone.

*Example 2.—1-dehydro-6β-fluoroprogesterone (6β-fluoro-1,4-pregnadiene-3,20-dione)*

Five 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with spores of Septomyxa affinis A.T.C.C. 6737. The Erlenmeyer flasks are shaken at room temperature (about 26 to 28 degrees centigrade) for a period of two days. At the end of this period this 500-milliliter volume is used as an inoculum for ten liters of the same glucose-corn steep liquor medium which in addition contains five milliliters of an antifoam compound (two milliliters silicone anti-foam oil). The fermentor is placed into the water-bath, adjusted to 28 degrees centigrade and the contents stirred (300 r.p.m.) and aerated (0.1 liter of air per minute to ten liters of beer). After twenty hours of incubation, when a good growth has been developed, one gram of 6β-fluoroprogesterone dissolved in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The column is packed with 100 grams of Florisil and is developed with 200-milliliter fractons each of Skellysolve B hexanes containing three percent, five percent, 7.5 percent and ten percent and twelve percent acetone. The crystalline material which is obtained from the ten and twelve percent acetone in Skellysolve B hexanes elutions is recrystallized from ether-Skellysolve B hexanes to give crystals of 1-dehydro-6β-fluoroprogesterone.

Instead of Septomyxa, species of other genera named in Example 1 can be used to introduce a $\Delta^1$-bond into 6β-fluoroprogesterone.

*Example 3.—1-dehydro-6α-fluoroprogesterone*

A solution containing two grams of 6α-fluoroprogesterone, two grams of selenium dioxide, 100 milliliters of tertiary butyl alcohol and three milliliters of acetic acid was heated at reflux for a period of eight hours. Most of the solvent was then evaporated under a stream of nitrogen. Methylene chloride was added and the solution was filtered through a bed of Celite (diatomaceous earth). The filtrate was washed consecutively with water, freshly prepared aqueous ammonium sulfide solution, dilute aqueous ammonium hydroxide solution and water. The solution was dried over magnesium sulfate and the solvent was removed by evaporation under a stream of nitrogen. The residue was dissolved in methylene chloride and chromatographed through a 100 gram Florisil synthetic magnesium silicate column packed wet with Skellysolve B hexanes. After washing the column with 500 milliliter portions of two percent, five percent, six percent and eight percent acetone in Skellysolve B hexanes, the product was eluted with ten percent and twelve percent acetone in Skellysolve B hexanes. The product was recrystallized three times from acetone-Skellysolve B hexanes to yield 165 milligrams of 1-dehydro-6α-fluoroprogesterone melting at 165 to 172 degrees centigrade. Analysis gave a rotation $[\alpha]_D$ plus 103 degrees (chloroform); ultraviolet absorption

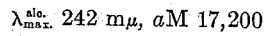

$\lambda_{max.}^{alc.}$ 242 mμ, aM 17,200 and the following:

*Analysis.*—Calculated for $C_{21}H_{27}FO_2$: C, 76.33; H, 8.25; F, 5.75. Found: C, 75.88; H, 8.32; F, 5.90.

In the same manner substituting 6β-fluoroprogesterone for 6α-fluoroprogesterone and following the procedure of Example 3 is productive of 1-dehydro-6β-fluoroprogesterone, a crystalline solid.

*Example 4.—Isomerization of 1-dehydro-6β-fluoroprogesterone to 1-dehydro-6α-fluoroprogesterone*

A solution of 0.15 gram of 1-dehydro-6β-fluoroprogesterone in twelve milliliters of chloroform and 0.1 milliliter of absolute alcohol is cooled to minus ten degrees centigrade in an ice-salt bath and a stream of anhydrous hydrogen chloride is gently bubbled through the solution for 2.5 hours while the temperature is maintained between zero and minus fifteen degrees centigrade. The solution is then washed with dilute sodium bicarbonate and water, dried over anhydrous sodium sulfate, and evaporated to dryness under reduced pressure. Crystallization of the residue from acetone-Skellysolve B hexanes gives 1-dehydro-6α-fluoroprogesterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. 1-dehydro-6-fluoroprogesterone.
2. 1-dehydro-6α-fluoroprogesterone.
3. 1-dehydro-6β-fluoroprogesterone.

References Cited by the Examiner

UNITED STATES PATENTS 2,838,528   6/1958   Campbell _____ 260—397.3

LEWIS GOTTS, *Primary Examiner.*

B. E. LANHAM, JULIUS FROME, *Examiners.*